(12) United States Patent
Wilks et al.

(10) Patent No.: US 7,059,442 B2
(45) Date of Patent: Jun. 13, 2006

(54) DRIVE ASSEMBLY FOR FOUR-WHEEL DRIVE VEHICLES

(75) Inventors: Eberhard Wilks, Daufenbach (DE); Manfred Eidam, Wilthen (DE); Wolfgang Wiest, Ulm (DE); Peter Dziuba, Frickingen (DE)

(73) Assignees: GKN Walterscheid GmbH (DE); Bibus Hydraulik AG (DE)

( * ) Notice: Subject to any disclaimer, the term of this patent is extended or adjusted under 35 U.S.C. 154(b) by 0 days.

(21) Appl. No.: 10/080,356

(22) Filed: Feb. 21, 2002

(65) Prior Publication Data

US 2002/0125058 A1 Sep. 12, 2002

(30) Foreign Application Priority Data

Feb. 21, 2001 (DE) .......................... 101 08 368

(51) Int. Cl.
*B60K 17/356* (2006.01)

(52) U.S. Cl. ....................... 180/242; 180/305

(58) Field of Classification Search ................. 180/243, 180/242, 247, 248, 249, 250, 305, 307, 308
See application file for complete search history.

(56) References Cited

U.S. PATENT DOCUMENTS

| | | | | |
|---|---|---|---|---|
| 2,996,135 A | * | 8/1961 | Grabow ....................... 180/307 |
| 3,979,972 A | | 9/1976 | Sakai et al. |
| 4,306,640 A | | 12/1981 | Morgan |
| 4,886,142 A | * | 12/1989 | Yamaoka et al. ........... 180/242 |
| 4,888,949 A | * | 12/1989 | Rogers ......................... 60/434 |
| 2002/0070065 A1 | * | 6/2002 | Bracke et al. .............. 180/242 |

FOREIGN PATENT DOCUMENTS

| | | |
|---|---|---|
| DE | 40 34 689 C2 | 1/1994 |
| DE | 42 09 950 C2 | 8/1994 |
| DE | 197 47 459 A1 | 5/1999 |
| DE | 198 27 130 A1 | 12/1999 |
| EP | 0 562 594 A1 | 9/1993 |
| GB | 2 151 565 A | 7/1985 |
| GB | 2 257 496 A | 1/1993 |
| WO | WO 93/09002 | 5/1993 |

\* cited by examiner

*Primary Examiner*—Anne Marie Boehler
(74) *Attorney, Agent, or Firm*—Harness, Dickey & Pierce, P.L.C.

(57) ABSTRACT

A drive assembly for vehicles with front wheels and rear wheels, especially for tractors, agricultural machinery, construction machinery or for self-driving machines, has an engine (1), a first drive (15) to drive the rear wheels, a second drive (27) to drive the front wheels, an adjustable hydraulic pump (5) driven by the engine (1), and an adjustable first hydraulic motor (9). The first hydraulic motor (9), with respect to drive, is connected to the first drive (15) to drive the rear wheels. Also, the first hydraulic motor, with respect to drive, may be connected to the second drive (27), to drive the front wheels. A second hydraulic motor (10), with respect to drive, can be connected to the second drive (27) to drive the front wheels. The first hydraulic motor (9) has a high coefficient of efficiency within a first driving speed range of the vehicle. The second hydraulic motor (10) has a high coefficient of efficiency within a second driving speed range of the vehicle. The first driving speed range is above the second driving speed range, with both driving speed ranges overlapping.

9 Claims, 1 Drawing Sheet

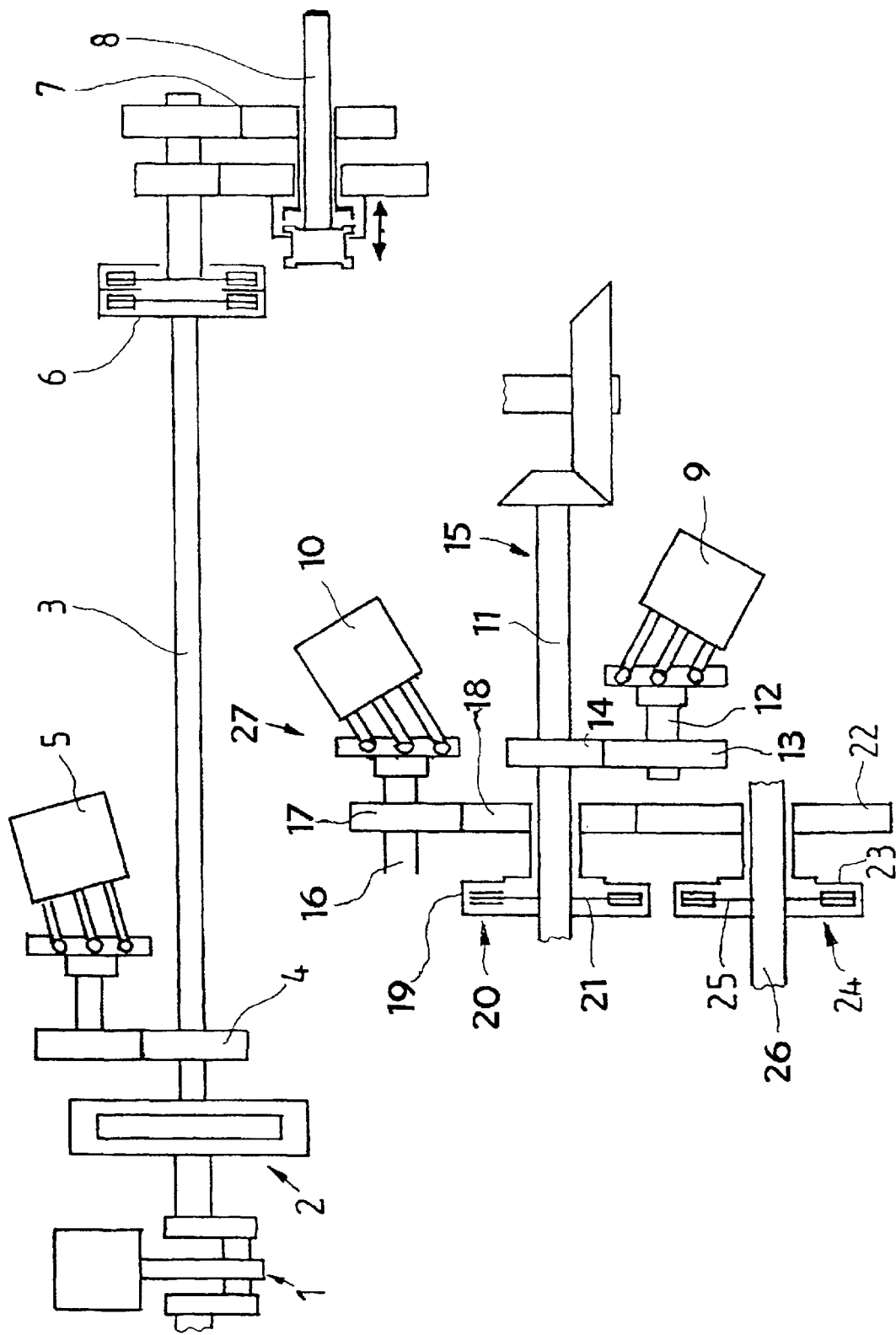

DRIVE ASSEMBLY FOR FOUR-WHEEL DRIVE VEHICLES

RELATED APPLICATIONS

This application claims priority to German Patent Application No. 10108368.8-12 filed Feb. 21, 2001, which application is herein expressly incorporated by reference.

BACKGROUND OF THE INVENTION

The invention relates to a drive assembly for motor vehicles with front wheels and rear wheels, especially for tractors, agricultural machinery, construction machinery or self-propelled machines.

The prior art illustrate fully hydro-statically driven vehicles which use a hydraulic pump to be driven by an engine. The hydraulic pump, in turn, drives hydraulic motors at the driving axles of the wheels. In order to continuously vary the driving speed, the hydraulic pump is in the form of an adjustable pump and/or the hydraulic motors are in the form of adjustable motors. However, as a rule, the range of adjustment of the hydraulic pump and of the hydraulic motors is normally only sufficient to cover a driving speed range up to approximately 25 km/h. In order to enable higher driving speeds, prior art drive concepts are usually provided with an unsynchronised two-stage gearbox. Thus, it is possible for the driver to choose between two gears. One gear is for lower speeds and one gear is for higher speeds. However, because of the normally unsynchronised nature of the gearbox, the vehicle has to be stopped before the gear-changing operation can take place.

As a rule, hydrostatic drive systems include one driving speed range where the coefficient of efficiency is clearly higher than in the remaining driving speed ranges. Normally, a hydrostatic drive system is designed such that the high coefficient of efficiency is reached at mean driving speeds. However, when the vehicle is driven at an extremely low speed or at higher speeds, the coefficient of efficiency is unacceptably low.

Furthermore, prior art four-wheel drives with a hydrostatic drive have a rigid connection between the front axle and the rear axle. In curves, the rigid connection is disadvantageous because the curve radius of the front wheels is greater than the curve radius of the rear wheels. This results in torsion in the drive elements and in the driveshafts. The torsion occurring in the drive elements results in reactive power which, depending on the wheel contact area, leads to slip at the front and rear wheels. The slip, in turn, leads to greater tire wear or, if the vehicle is driven in fields, it leads to the turf being torn up.

SUMMARY OF THE INVENTION

It is an object of the present invention, to provide a drive assembly which has a driving speed range as wide as possible. Also, the drive assembly has a coefficient of efficiency as high as possible. Further, in the drive assembly, when curves are negotiated, torsion in the drive elements is avoided.

In accordance with the invention, a drive assembly for four-wheel drive vehicles with front wheels and rear wheels, especially for tractors for agricultural machinery, construction machinery or for self-propelled machines, comprises an engine; a first drive for driving the rear wheels; a second drive for driving the front wheels; an adjustable hydraulic pump driven by the engine; an adjustable first hydraulic motor drivingly connected to the first drive to drive the rear wheels. Also, the first hydraulic motor drivingly connectable to the second drive to drive the front wheels. A second hydraulic motor is drivingly connectable to the second drive to drive the front wheels. The first hydraulic motor has a high coefficient of efficiency within a first driving speed range of the vehicle. The second hydraulic motor has a high coefficient of efficiency within a second driving speed range of the vehicle. The first driving speed range is above the second driving speed range, however, an overlap exists with the first driving speed range.

By means of the above drive assembly, it is possible to achieve three different driving situations. In the first stage, the first hydraulic motor of the first drive drives the rear wheels. Here the second hydraulic motor is drivingly connected to the second drive to drive the front wheels. The first drive and the second drive are not mechanically connected to one another. This means that in this first stage, any torsion in the drive elements, in curves, is avoided since the first drive and the second drive transmit torque independently of one another.

The first hydraulic motor has a high coefficient of efficiency in the first driving speed range of the vehicle, normally in the main driving speed range. In the case of tractors, this range is preferably between 5 and 12 km/h. On the other hand, the second hydraulic motor has a high coefficient of efficiency in the second higher driving speed range. Accordingly, in the main driving speed range, the first hydraulic motor takes on a clearly higher percentage of the entire driving torque than the second hydraulic motor. Thus, in the first stage, the rear wheels transmit a higher driving torque than the front wheels. Preferably, 70% of the entire driving torque is transmitted by the rear wheels and 30% of the entire driving torque by the front wheels. As soon as the driving speed of the vehicle increases, this ratio changes as a result of the change in the coefficients of efficiency of the hydraulic motors as a function of driving speed. In this second driving speed range, which is above the first driving speed range, the greatest percentage of the entire driving torque is transmitted by the front wheels. Thus, this ensured that high torque values with a high coefficient of efficiency are transmitted over a large driving speed range.

In a second stage, the first hydraulic motor is connected to both the first drive to drive the rear wheels and to the second drive to drive the front wheels. Accordingly, a rigid connection exists between the front wheels and the rear wheels. Thus, the same torque is transmitted to all wheels with a high coefficient of efficiency being achieved over a very wide driving speed range. In addition, the second stage is important since, in the first stage, the drive assembly constitutes a hydraulic central differential because both hydraulic motors are driven by a joint pressure source, i.e. the hydraulic pump. The distribution of torque between the front wheels and rear wheels can be influenced via the pivot angle. For example if the front wheels spin, the rear wheels are no longer driven. Thus, it is necessary to provide a mechanical lock which connects the first drive to the second drive. This is achieved by connecting the first hydraulic motor to the first drive and to the second drive.

In a third stage, the second hydraulic motor is connected to the first drive to drive the rear wheels. Thus, a purely rear-wheel drive is placed into effect.

A switchable coupling is provided to connect the second hydraulic motor to the first drive to drive the rear wheels. Also, a second switchable coupling may be provided to connect the second hydraulic motor to the second drive to drive the front wheels. In a preferred embodiment, the adjustable hydraulic pump is an axial piston pump of the inclined disc type or of the inclined axis type. The second hydraulic motor is an adjustable hydraulic motor. As a result of this, it becomes possible to provide a free distribution of torque between the first drive to drive the rear wheels and the second drive to drive the front wheels. The first hydraulic motor is preferably an axial piston motor of the inclined disc type or of the inclined axis type. Equally, the second hydraulic motor is preferably an axial piston motor of the inclined disc type or of the inclined axis type.

In order to increase the high efficiency range of the hydraulic motors, the first hydraulic motor and the second hydraulic motor are axial piston motors of the inclined disc type or of the inclined axis type. The motors enable a pivot angle of any value up to 45 degrees.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A preferred embodiment of the invention will now be described in greater detail with reference to the drawing wherein the FIGURE is a diagrammatic view of a drive assembly in accordance with the invention.

DETAILED DESCRIPTION OF THE PREFERRED EMBODIMENTS

The following description of the preferred embodiment(s) is merely exemplary in nature and is in no way intended to limit the invention, its application, or uses.

The FIGURE shows a vehicle engine 1 connected by a vibration damper 2, to a main driveshaft 3. An adjustable hydraulic pump 5, via a gear box assembly 4, is drivable by the main driveshaft 3. The hydraulic pump 5 is an axial piston pump of the inclined axis type. Further, the main driveshaft 3 is connected by a switchable coupling 6 to a two-stage gearbox 7. The two-stage gearbox 7 includes an output shaft 8 to drive an implement. The engine 1 is driven at a constant rotational speed. The two-stage gearbox 7 is preferably designed such that gear-changing takes place between 540 RPM and 1000 RPM at the output shaft 8. The output shaft 8 being a power take-off shaft to drive agricultural implements.

A line connection exists between the hydraulic pump 5, on the one hand, and a first hydraulic motor 9 and a second hydraulic motor 10, on the other hand. Both hydraulic motors 9, 10 are axial piston motors of the inclined axis type.

Via an output shaft 12 and the two gears 13, 14, the first hydraulic motor 9 drives the first driveshaft 11. The first driveshaft 11, via further gearbox members, serves to drive the rear wheels of the vehicle. Together, they form the first drive 15.

Via a second shaft 16 and gears 17, 18, the second hydraulic motor 10 drives an outer part 20 of a first switchable coupling 19. An inner part 21 of the first switchable coupling 19 is connected to the first shaft 11 of the first drive 15 to drive the front wheels.

The second hydraulic motor 10, via the second shaft 16 and gears 17, 18 as well as further gear 22, is connected to the outer part 23 of a second switchable coupling 24. An inner part 25 of the second switchable coupling 24 is connected to a shaft 26. The shaft 26 drives the front wheels. Together, they form a second drive 27 which drives the front wheels of the vehicle.

The engine 1 runs at a constant rotational speed. However, the driving speed of the vehicle may be continuously varied by the adjustable hydraulic pump 5 and the hydraulic motors 9, 10. At least one of the hydraulic motors, such as the first hydraulic motor 9, is adjustable with regards to its absorption volume. In the stage where the first switchable coupling 19 is open, non-torque transmitting position, and where the second switchable coupling 24 is closed, torque transmitting position, the front wheels are driven entirely by the second hydraulic motor 10. Also, the rear wheels are driven entirely by the first hydraulic motor 9. This stage thus constitutes a hydraulic central differential because both hydraulic motors 9, 10 are connected to the hydraulic pump 5.

The torque values which are transmitted to the front wheels or to the rear wheels can be freely selected. However, in principle, it is also possible to select a solution wherein the second hydraulic motor 10 is a constant motor.

A rigid mechanical connection between the first shaft 11 of the first drive 15 and the shaft 26 of the second drive 27 exist if both the first switchable coupling 19 and the second switchable coupling 24 are closed. This stage constitutes a differential lock. Accordingly, the same torque value is applied to all wheels.

In a third stage, the first switchable coupling 19 is closed and the second switchable coupling 24 is open. Thus, the first hydraulic motor 9 and the second hydraulic motor 10 drive the first shaft 11 of the first drive 18 and the rear wheels. In this stage, the front wheels run freely and are not driven.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive assembly for four-wheel drive vehicles with front wheels and rear wheels, for tractors, agricultural machinery, construction machinery or for self-propelled machines, comprising:

an engine;

a first drive for driving the rear wheels;

a second drive for driving the front wheels;

an adjustable hydraulic pump driven by the engine;

an adjustable first hydraulic motor drivingly connected to the first drive for driving the rear wheels and drivingly connectable to the second drive for driving the front wheels; and a second hydraulic motor drivingly connectable to the second drive for driving the front wheels;

said first hydraulic motor having a high coefficient of efficiency within a first driving speed range of the vehicle and the second hydraulic motor having a high coefficient of efficiency within a second driving speed range of the vehicle; and wherein the second driving speed range is above the first driving speed range, with an overlap existing between the first driving speed range and the second driving speed range.

2. A drive assembly according to claim 1, wherein the second hydraulic motor being connectable by a first switchable coupling to the first drive for driving the rear wheels.

3. A drive assembly according to claim 1, wherein the second hydraulic motor being connected by a second switchable coupling to the second drive for driving the front wheels.

4. A drive assembly according to claim 1, wherein the adjustable hydraulic pump being an inclined disc axial piston pump or an inclined axis axial piston pump.

5. A drive assembly according to claim 1, wherein the second hydraulic motor is adjustable.

6. A drive assembly according to claim 1, wherein the second hydraulic motor being an inclined disc axial piston motor or an inclined axis axial piston pump.

7. A drive assembly according to claim 6, wherein a pivot angle of the second hydraulic motor amounts to any value up to 45 degrees.

8. A drive assembly according to claim 1, wherein the first hydraulic motor being an inclined disc hydraulic motor or an inclined axis hydraulic motor.

9. A drive assembly according to claim 8, wherein a pivot angle of the first hydraulic motor amounts to any value up to 45 degrees.

* * * * *